United States Patent [19]

Moler

[11] Patent Number: 5,142,592
[45] Date of Patent: Aug. 25, 1992

[54] METHOD AND APPARATUS FOR DETECTION OF PARALLEL EDGES IN IMAGE PROCESSING

[76] Inventor: Keith E. Moler, 1601 W. Macarthur Blvd., #10E, Santa Ana, Calif. 92704

[21] Appl. No.: 629,259

[22] Filed: Dec. 17, 1990

[51] Int. Cl.$^5$ .............................................. G06K 9/48
[52] U.S. Cl. ........................................ 382/22; 382/25
[58] Field of Search .................................. 382/22, 25

[56] References Cited

U.S. PATENT DOCUMENTS

| | | | |
|---|---|---|---|
| 4,790,026 | 12/1988 | Gennery et al. | 382/41 |
| 4,843,630 | 6/1989 | Catros et al. | 382/22 |
| 4,958,374 | 9/1990 | Tokita et al. | 382/22 |
| 4,987,603 | 1/1991 | Ohnishi et al. | 382/25 |

OTHER PUBLICATIONS

Mechanical Engineering, Ellen C. Hildreth, "Edge Detection for Computer Vision System", pp. 48–53, Aug. 1982.

*Primary Examiner*—Leo H. Boudreau
*Assistant Examiner*—Barry Stellrecht
*Attorney, Agent, or Firm*—Roy A. Ekstrand

[57] ABSTRACT

A method and apparatus for detection of parallel edges in image processing systems is shown. A video source producing an image which is operated upon by Laplacian of Gaussian operator to produce an LOG image within which sign changes are detected to produce a zero crossing edge detected image. A vector gradient field of the LOG image is computed and subjected to a gradient field smoothing operation to produce a smoothed gradient field. The smoothed gradient field is examined to detect scaler minima within the field and the results thereof used to compute parallelism strength in accordance with preestablished criteria to generate a parallelism line image which is printed using a conventional printer.

12 Claims, 7 Drawing Sheets

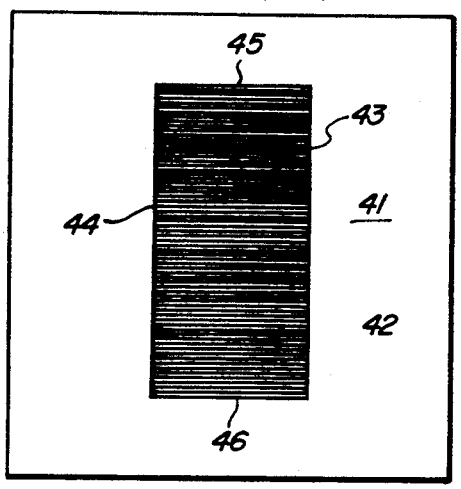
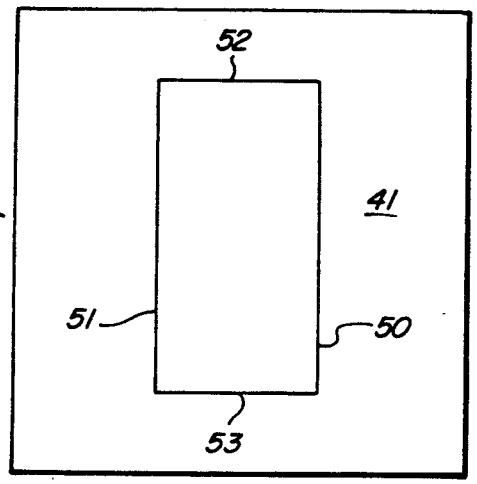
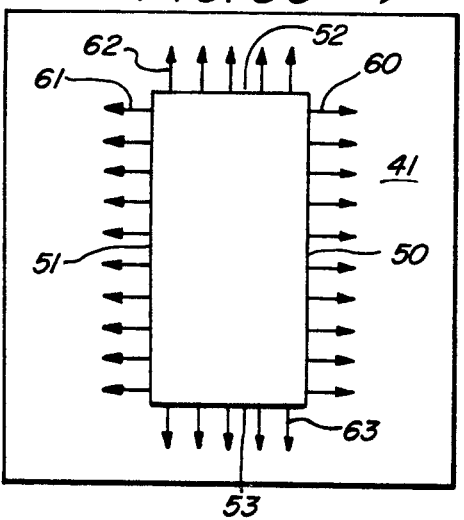
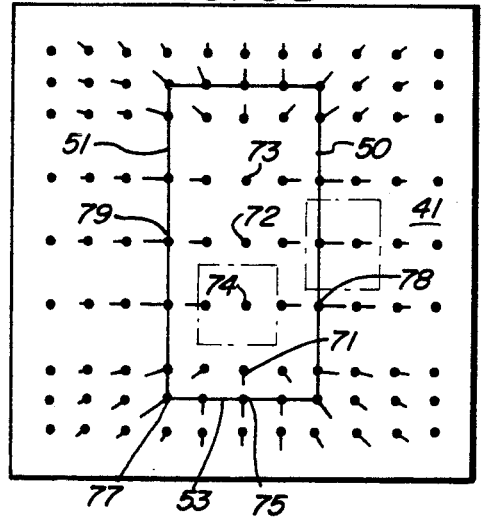
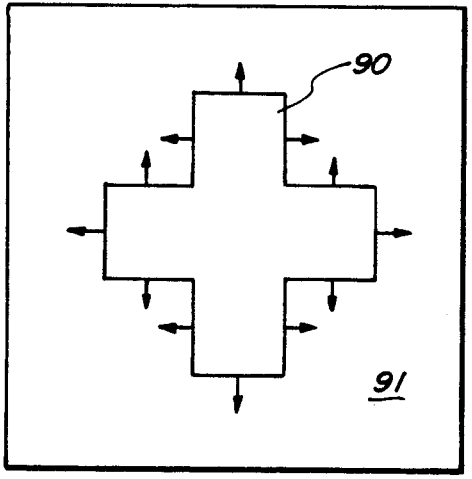
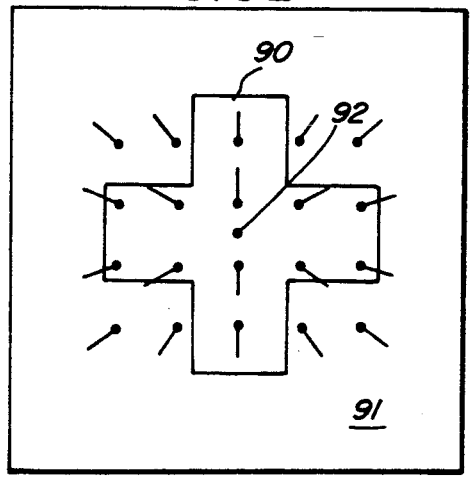

The world which
between the cos
spatial dimension

Events happen i
other in time (ie.
ie. concurrently

The world which
between the cos
spatial dimension

Events happen i
other in time (ie.
ie concurrently

METHOD AND APPARATUS FOR DETECTION OF PARALLEL EDGES IN IMAGE PROCESSING

FIELD OF THE INVENTION

This invention relates generally to image processing and particularly to the detection of parallel edges in image analysis.

BACKGROUND OF THE INVENTION

The occurrences and applications for various forms of image processing have experienced an overwhelming growth with the advent of high power computing systems. Such image processing systems are utilized in a variety of fields including computer image enhancement, robotic viewing and monitoring systems, object and target recognition in surveillance and weapons systems, and character recognition in character scanning systems such as optical character readers and the like. This is by no means an exhaustive list of image processing environments but is indicative of the diversity of uses for image processors. While image processing systems are required to deal with a great diversity of problems and challenges characteristic of the specific environment of the image processing system, most image processing systems are subjected to two basic or overall challenges which may be generally referred to as recognition and noise filtering.

Recognition basically involves the determination of the nature and extent of the image elements presented to the system. For example, an aerial or satellite photo presents a collection of different contrast areas. However, little information is present as to which areas are objects and which are shadows. Similarly, little or no information may be available as to which elements are to be grouped in a collective object. Also a determination of which elements are manmade and which are surrounding topography may also be difficult to determine. Another example of a recognition challenge is found in the analysis of a section of test material. To the image processing system, test material presents a plurality of elements or strokes which must be grouped into characters, words and so on.

Noise filtering, on the other hand, involves distinguishing between image information from the viewed object and extraneous information added by the various system components.

Recognition and noise filtering are, of course, interrelated in any image processing system. For example, attempts to reduce noise using techniques such as threshold filtering often sacrifice information which may be deemed valuable in the recognition process.

One of the more basic aspects in image processing is the detection of parallelism among the image elements. The detection of parallelism provides a basic tool in image processing because parallelism in present in a substantial number and variety of image elements. For example, a picture of a tree contains a large number of parallel edges. At the largest scale, the trunk possesses a left and right vertical border which are highly parallel to each other. At finer scale, the branches and even the twigs display a similar parallelism. While naturally occurring image elements provide substantial parallelism, manmade images possess an even greater degree of inherent parallelism. One example of manmade image parallelism is found in text material which generally comprises a number of strokes, each of which usually defines two parallel edges.

In addition to a strict definition of parallelism, other objects which do not possess classic parallel edges may be generally considered parallel to derive valuable image processing information. For example, objects which possess an axis of symmetry such as an hourglass or cone may possess an overall characteristic within an image which is similar to parallelism and which may be desired to be treated in the manner parallel edges are treated.

The intensity of effort by practitioners in the image processing art has resulted in the publication of a number of related articles and treatises. The following are included in such relevant publications:

Binford, Thomas. 1971. Visual Perception by Computer. IEEE conference on Systems and Control. December, 1971, Miami.

Blum, H. 1973. Biological shape and visual science, part 1. J. Theor. Biol. 38, 205-287.

Canny, John. 1986. A computational approach to edge detection. IEEE PAMI, Vol PAMI-8, no. 6., November 1986.

Hildreth, Ellen. 1984. The Measurement of Visual Motion. MIT Press.

Marr, David. 1982. Vision. W. H. Freeman. New York.

Rao, Kashipati and Nevatia, Ramakant. 1989. Descriptions of complex objects from incomplete and imperfect data. Proceeding of the DARPA image understanding conference. May 1989, Palo Alto, Calif.

The foregoing provide a sampling of the various methods of image processing techniques which are known. In addition, other examples are found in the following U.S. Patents: U.S. Pat. No. 4,618,989 issued to Keisuke, et al. sets forth a METHOD AND SYSTEM FOR DETECTING ELLIPTICAL OBJECTS in which the geometric properties an ellipse are determined separately on three parameter sub-spaces obtained on the basis of edge vector field.

U.S. Pat. No. 4,424,588 issued to Takashi, et al. sets forth a METHOD FOR DETECTING THE POSITION OF A SYMMETRICAL ARTICLE by converting image signals of the article into binary information and detecting the position of the article based upon the binary information. A first median point is determined from the binary information which is between two points of intersection between a first straight line intersecting the article and the sides of the article. A second median point is determined from the binary information which is between two points of intersection between a second straight line passing through the first median point crossing the first straight line at right angles and crossing the sides of the article.

U.S. Pat. No. 4,896,279 issued to Yoshida sets forth a METHOD AND APPARATUS FOR INSPECTING AN EXTERNAL SHAPE OF AN OBJECT HAVING A SYMMETRY in which an object is sensed by a photoelectric conversion sensor having a photoelectric conversion screen expressed as an XY coordinate grid such that the symmetrical axis of the object is parallel to one axis of the XY coordinate. Coordinates at a plurality of right and left points with respect to the other axis of the XY coordinate at which an external contour of the object intersects a plurality of straight lines perpendicular to the symmetrical axis are determined.

U.S. Pat. No. 4,435,836 issued to Ruben sets forth a TECHNIQUE FOR EXTRACTING FEATURES FROM IMAGES in which attributes or features of a portion of a picture are represented by one or more strokes which are formed using special purpose hardware and a processing algorithm which operates on a hypothesize-and-test mode. Each assumed stroke is tested using parallel processing and the test result is used to determine the next hypothesis. A minimum of information is maintained indicating prior test results.

U.S. Pat. No. 4,504,969 issued to Arai sets forth a RECTANGULAR PATTERN RECOGNITION APPARATUS which operates to recognize and note the position of solid line rectangles drawn on an input form, document, or the like. The apparatus first recognizes vertical and horizontal line segments and then discriminates the areas which lie within the joined segments.

U.S. Pat. No. 4,574,357 issued to Parker sets forth a REAL TIME CHARACTER THINNING SYSTEM in which a convolver is used for identifying pixels within digitized video which are to be retained as part of the thinned image. Those pixels which are to be discarded and contingent pixels which may be part of the thinned image. A matrix filter is coupled to the convolver for determining which of the contingent pixels are to be discarded or retained in the thinned image.

U.S. Pat. No. 4,769,850 issued to Itoh sets forth a PATTERN RECOGNITION SYSTEM which separately extracts circular and linear components from a complex image. The apparatus uses circular filter means, a first calculator element for computing average image concentration value, a second calculator element for computing a first feature valuation of directional components, a third calculator element for computing a second feature value evaluated within maximum directional component weakening, and a mode selector for selectively applying the first feature value and the second feature value.

U.S. Pat. No. 4,906,099 issued to Casasent sets forth METHODS AND APPARATUS FOR OPTICAL PRODUCT INSPECTION in which products having optically detectable straight line segments are inspected for acceptability by forming one or more one dimensional images of the product in which properly aligned straight line segments are respectively focused to points in the image.

While the foregoing efforts at improving image processing have provided some benefit, there remains a neverending need for improved methods of image processing.

SUMMARY OF THE INVENTION

Accordingly, it is a general object of the present invention to provide an improved image processing method and apparatus. It is a more particular object of the present invention to provide an improved image processing method and apparatus which provides effective detection of parallel edges.

In accordance with the present invention, there is provided for use in detecting parallel and near parallel edges in an image, parallel edge detection means comprises: edge detection means for detecting the edges within the image corresponding to image contrast changes and for producing an edge detected image; edge gradient means for computing a vector gradient field for the edge detected image; gradient field smoothing means for smoothing the vector gradient field to a smoothed vector gradient field; minima detection means for detecting the minima within the smoothed vector gradient field; and parallelism strength computation means for computing parallelism strength of the smoothed vector field and for producing a parallelism line image.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which.

FIGS. 3A through 3B set forth sequential diagrams illustrating the operation of the present invention method and apparatus for detection of parallel edges;

FIGS. 8A and 8B, 9A and 9B, and 10 set forth diagrams representing the performance of the present invention method and apparatus for the detection of joints.

DESCRIPTION OF THE PREFERRED EMBODIMENT

Figure 1:
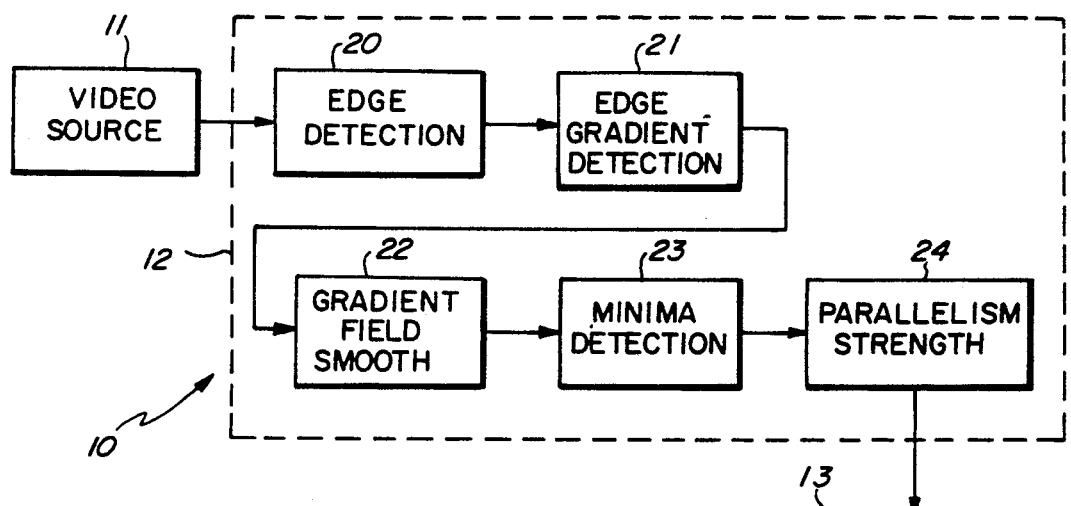
FIG. 1 sets forth a block diagram of a system for detection of parallel edges constructed in accordance with the present invention.

FIG. 1 sets forth a block diagram representation of the present invention apparatus for detection of parallel edge generally referenced by numeral 10. A source of video information 11 is coupled to a precessor 12, the output of which is coupled to a printer 13. Processor 12 includes edge detection means 20, the output of which is coupled to an edge gradient detection means 21. Edge gradient detection means 21 further coupled to a gradient field smoothing means 22 having an output coupled to a minima detector 23. Minima detector 23 in turn is coupled to a parallelism strength detection means 24 having an output coupled to printer 13.

In operation, video source 11 which, in its preferred form, may comprise a conventional video provides information to edge detection means 20. Edge detection means 20 uses the well established MARR-Hildreth Laplacian of Gaussian edge detection operator to produce a LOG image in which changes in sign between adjacent pixels indicate the presence of an edge. The image of edge pixels referred to as the zero crossings images is thereafter produced which locates the edge portions of the video information. The edge detected or zero crossings image is coupled to edge gradient detection means 21 which is operative upon each edge pixel in the zero crossing image to assign a magnitude and direction for each edge. The magnitude and direction is achieved by computing the gradient of the LOG image at each pixel location in accordance with the following formula:

$$\text{grad LOG} = \left( \frac{\partial \text{LOG}}{\partial x}, \frac{\partial \text{LOG}}{\partial y} \right)$$

The resulting of edge gradient detector 21 is a gradient vector field in which the magnitude and direction of the transition for each image edge detected by edge detector 20 is assigned a corresponding magnitude and direction value. By convention, this direction vector points from the darker side of the transition edge to the lighter side thereof. At all pixels other than edge pixels, the gradient vector field is assigned a value of zero. The gradient field's signal is coupled from edge gradient detector 21 to gradient field smoothing means 22. Within gradient field smoothing means 22, the gradient vector field is convolved with a two dimensional gaussian function in accordance with the following formula:

$$G(r) = \frac{1}{2\pi\sigma^2} e^{\frac{-r^2}{2\sigma^2}}$$

in which small e represents the base of the natural logarithmic system, r represents radius, an $\sigma$ represents the standard deviation of the Gaussian function. It has been found as a practical matter that the above is implemented as two convolutions in accordance with the following:

G(r)*GRADX and G(r)*GRADY

This convolution relates in a smoothed gradient vector field which is coupled to minima detection means 23. It has been found that two closely spaced edges of opposite orientation in the gradient field will produce a minimum magnitude in the smoothed gradient vector field at a point halfway between the edges. Thus, it has been found that detection of a minima in a smoothed gradient field produce a series of points representing the desired parallelism line. Accordingly, minima in the magnitude component of smoothed gradient vector field correspond to points of parallelism, near symmetry in the edge image. Thus, minima detector 23 is operative solely upon the magnitude component of the smoothed gradient vector field. It has been found that two possible approaches are evident for the detection of magnitude minima. The first is referred to as directionally independent minima while the second is referred to as directionally dependent minima. Directionally independent minima arise in situations in which a signal point of minimum value is found and, as a result, movement in any direction therefrom produces an increased magnitude. In contrast, directionally dependent minima corresponds to a line or plane in which the minimum magnitude exists at a plurality of points in one or more directions while an increase in magnitude results in certain directions only. Directionally dependant minima approximately corrrespond to the axis of symmetry of an object.

It has been found that while the directionally independent minima may be detected using a first derivative process, the detection of directionally dependent minima requires that the second derivatives of the smoothed gradient field must be computed in both X and Y directions. The direction in which the second derivative is most strongly positive is used as the direction for directional minima detection.

Thus, for each point in the smooth gradient magnitude image, the following processing is applied:

1. The second derivative is computed in the X and Y directions.
2. The derivative which is most positive is used as the direction for the local minima computation.
3. The image is examined for a local minima in the specified direction. For example, if the computed direction is horizontal, then a directional minima is declared if the magnitude of the smoothed gradient vector field increases for both positive and negative increments of X where X corresponds to the horizontal direction.

The output of minima detection means 23 is coupled to parallelism strength computation means 24. Parallelism strength computation means 24 applies certain predetermined quantitative measures of parallelism to the minima detected output of minima detection means 23. For some purpose, it may be sufficient to merely delineate the parallelism axis of an object with a binary valued line. In general, however, it has been found more useful to compute a measure of the degree of parallelism at each axis point. The following three quantities or characteristics have been identified as usable quantitative measures of parallelism:

1. The spacing between the two parallel lines.
2. The relative orientation of the two lines.
3. The edge strength for the two lines.

While the values associated with each of the above quantities may be explicitly and accurately computed at each parallelism pixel, such an approach has not been found to be practical. A more practical approach has been found which uses two measures of parallelism strength which relates indirectly to the above quantities. The first measure which can be computed is the magnitude of the smoothed gradient vector field at each point on the parallelism line. In this computation, equal strength (contrast) edges one hundred eighty degrees apart in orientation will produce a near zero value smoothed gradient magnitude. In contrast, edges of different edge strength or orientation produce a greater smoothed gradient magnitude. Thus, a small smoothed gradient magnitude is an approximate indicator of a high degree of parallelism and similarity of edge strength.

The second measure of parallelism strength is the magnitude of the two directional second derivatives of the smoothed gradient magnitude in accordance with the following formula:

$$\text{Strength measure}(i,j) = \left[ \left( \frac{\partial^2 V}{\partial x^2} \right)^2 + \left( \frac{\partial^2 V}{\partial y^2} \right)^2 \right]^{\frac{1}{2}}$$

where capital V is the magnitude component of the smoothed gradient vector field and the derivatives are computed at a point (i,j). The value thus obtained relates to the rate of change of the length of the smooth gradient vectors. Thus, for two closely spaced edges, the vectors must reverse their orientation and pass through a point of near zero magnitude over a short spatial interval. Conversely, for edges which are not so closely spaced, the change will be more gradual and the second derivative will be smaller. In addition, edge contrast is explicit represented as the magnitude of the gradient vectors prior to smoothing. Thus, a reduced second derivative value indicates low contrast edges while a greater second derivative value indicates high contrast edges. As a result, this measure is useful for identifying parallelism edges which are derived from high contrast edges which are usually found to be of greater importance in an image than low contrast edges.

Thereafter, the output of parallelism strength means 24 is coupled to a printer 23 to produce a hard copy of the processed image.

Figure 2:
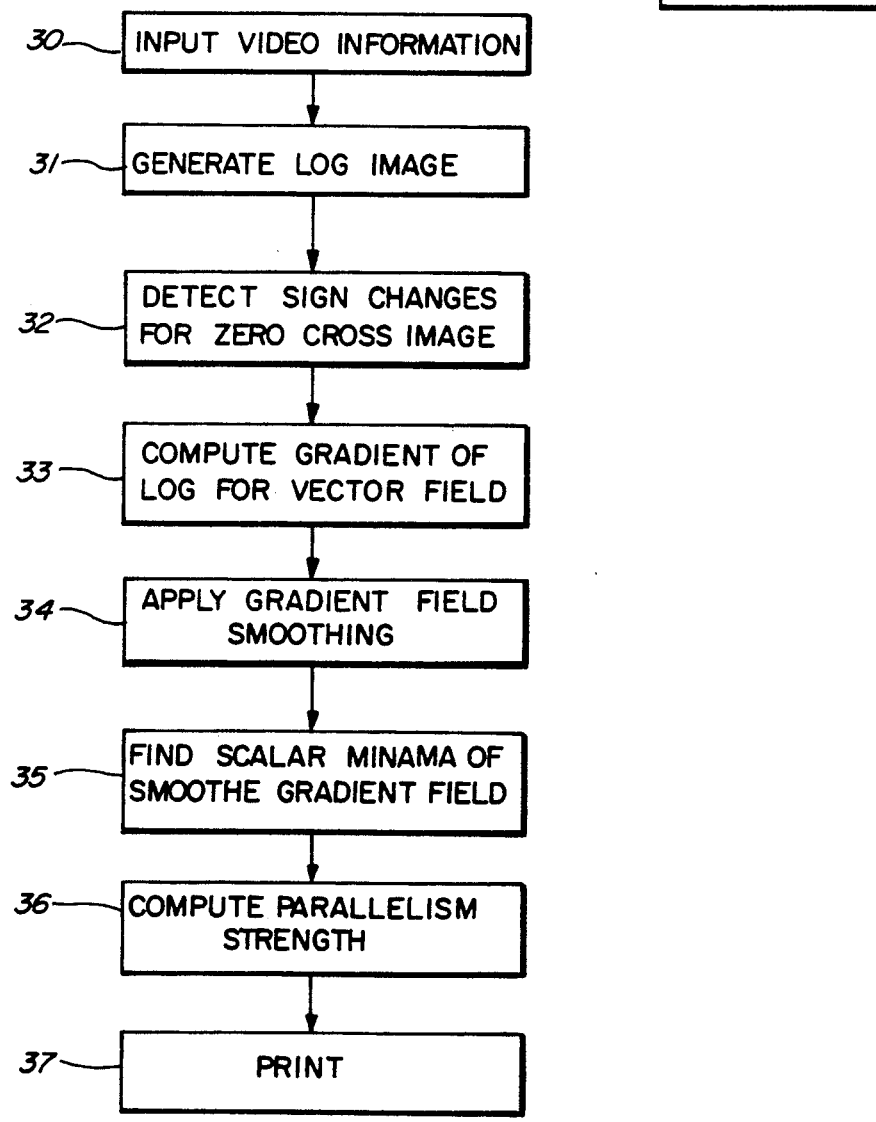
FIG. 2 sets forth a flow diagram for a method of detection of parallel edges in accordance with the present invention.

FIG. 2 sets forth a block diagram representation of the present invention method for detection of parallel edges in image processing. Thus, at an initial step 30 in the above method, the video information of the image inputted to the present invention system. FIG. 3A sets forth a sample image which may be used for illustration of the present invention method for detection of parallel edges. As is seen in FIG. 3A, an image 40 includes a white background 41 having a generally centered black rectangular image element 42. Image element 42 is bounded by a pair of parallel edges 43 and 44 on each side and a pair of parallel top and bottom edges 45 and 46 respectively. In accordance with the above described operation, the present invention method applies the video information to a step 31 in which an LOG image is generated in accordance with the above described Laplacian of Gaussian edge detection operator. Thereafter, at a method step 32, the sign changes of the LOG signal are detected to produce a zero crossing image signal which defines the detected edges of the image.

FIG. 3B sets forth an exemplary edge detected image corresponding to image 40. Edge detected image 40 defines a white background 41 having parallel side edges 50 and 51 and parallel top and bottom edges 52 and 53.

Thereafter, a method step 33 is carried forward in which the gradient vector field of the LOG image is determined. FIG. 3C sets forth a representation of the gradient vector field for image 40 resulting at step 33 of the method of FIG. 2. The gradient vector field includes a white background 41 as well as the side edges 50 and 51 and top and bottom edges 52 and 53 corresponding to the zero crossing edge detection image shown in FIG. 3B. In addition, however, each pixel along edges 50 through 53 has been resolved to a corresponding gradient vector. For purposes of illustration, a limited number of gradient vectors are shown. However, it should be understood that gradient vectors are produced in the gradient vector field for each pixel along each detected edge. Thus, a plurality of gradient vectors 60 are found extending outwardly from pixels along side edge 50. Correspondingly, a plurality of gradient vectors 60 extend from pixels along edge 51 and pluralities of gradient vectors 62 and 63 extend upwardly and downwardly from pixels on top edge 52 and bottom edge 53 respectively. As mentioned above, in accordance with convention, vectors 60, 61, 62 and 63 are shown extending in the dark to light transition direction of image 40. In addition, the magnitude of the vectors shown corresponds to the contrast change along their corresponding edges. In the example shown, however, since black rectangle 42 (seen in FIG. 3A) is entirely black, all edge vectors have the same amplitude.

Thereafter, at a method step 34, the vector gradient field is smoothed in the described above to produce the smoothed gradient vector field illustrated in FIG. 3D. Once again, it should be understood that, for purposes of illustration, a limited number of orientation vectors for a limited number of pixels are shown. It should be understood, however, that in the actual practice of the present invention, orientation vectors are computed for each pixel of the image. As can be seen, FIG. 3D maintains the white background 41 together with edges 50 through 53 of black rectangle 42 (the latter seen in FIG. 3A). In addition, however, the gradient vector field has been smoothed in accordance with the above-described process to resolve the gradient field shown in FIG. 3C to a plurality of orientation vectors. It should be noted that orientation vectors corresponding to pixels found along edges 50, 51, 52 or 53 such as vectors 78 and 79 extend outwardly from their respective edges in much the same manner described above. In addition, however, the smoothing process results in angled vector components at points within the smoothed gradient field such as vectors 77 and 76 which contain vector components in each direction. It should also be noted that the vectors corresponding to pixels 72, 73 and 74 at the center of black rectangle 42 have zero magnitude due to the cancellation of oppositely posed vectors in each direction. Thus, a line passing through pixels 72, 73 and 74 matches the central axis of the original black rectangle image. These points represent the desired parallelism line.

With continued reference to FIGS. 2 and 3D, the present invention method moves to a step 35 in which the scalar minima of the smoothed gradient field which correspond to pixels 72, 73 and 74 is detected to define the above-mentioned parallelism line. Thereafter, the present invention method moves to a step 36 in which the parallelism strength is computed in accordance with the above-described operation to produce a print-out at step 37 of the computed parallelism lines which in the example shown comprises a vertical line passing through pixels 72, 73 and 74.

Figure 4A:
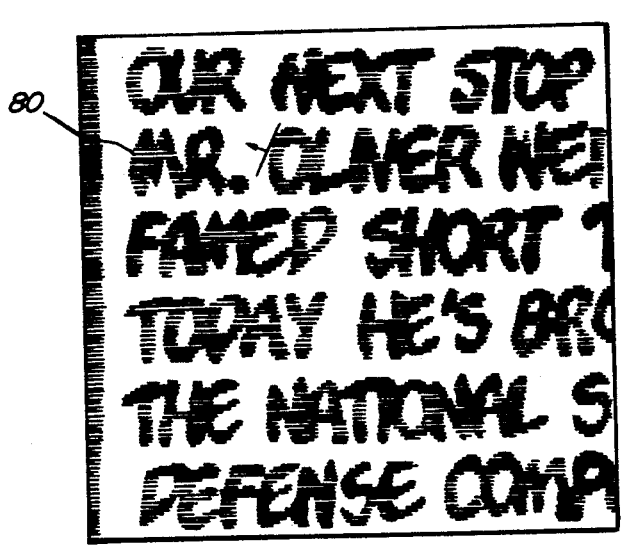
FIGS. 4A through 4C set forth the sequential operation of the present invention method and apparatus for detection of parallel edges operative upon a text image.
Figure 4B:
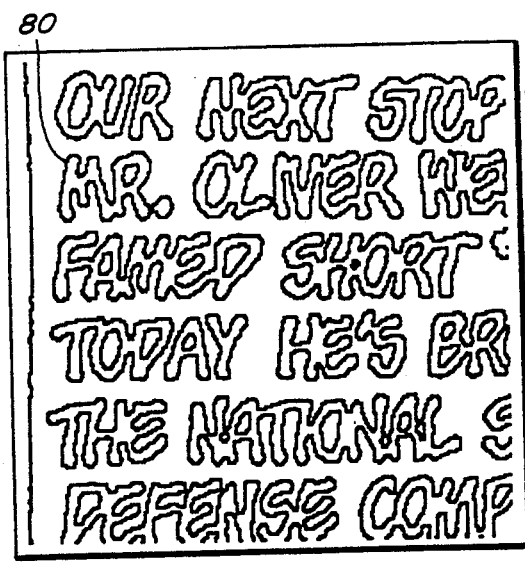
Figure 4C:
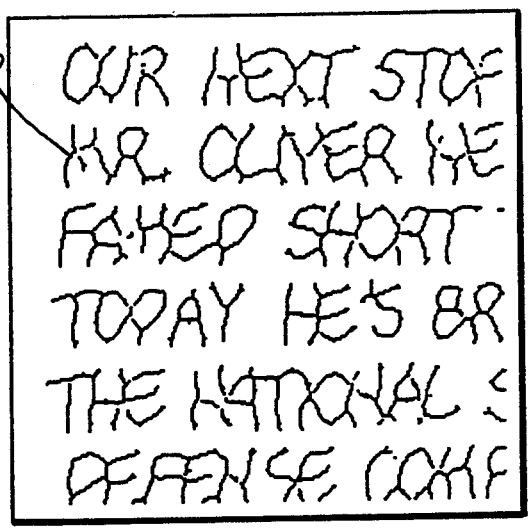

FIGS. 4A, 4B and 4C set forth depiction of the present invention apparatus and method applied to a portion of text image material. FIG. 4A shows the original text material. FIG. 4B depicts the resulting edge detection or zero crossing image which results from the operation of the present invention method. FIG. 4C represents the parallelism image produced in accordance with the above method. It should be noted that the parallelism lines of the present invention in FIG. 4C consistently follow the center lines of the strokes in the original image shown in 4A. In addition, some results appear to be significantly improved in quality and the parallelism lines image of FIG. 4C. For example, it should be noted that the capital letter M reference by numeral 80 in which two strokes overlap excessively in the original image of FIG. 4A has been resolved to distinct strokes in the parallelism image of FIG. 4C.

Figure 5A:
FIGS. 5A through 5C set forth sequential drawings of the operation of the present invention method and apparatus for detection of parallel edges operative upon a natural image.
Figure 5B:
Figure 5C:

FIGS. 5A, 5B and 5C set forth the operation of the present invention method and apparatus operative upon a natural image. FIG. 5A sets forth the original video information while FIG. 5B sets forth the zero crossing image and FIG. 5C sets forth the detected instances of parallelism and symmetry forming the parallelism line image in the manner described above. Of particular interest in the results shown in FIGS. 5A through 5C is the preservation of the distinctive features such as the eyes, pupils, eyebrows and locks of hair.

Figure 6A:
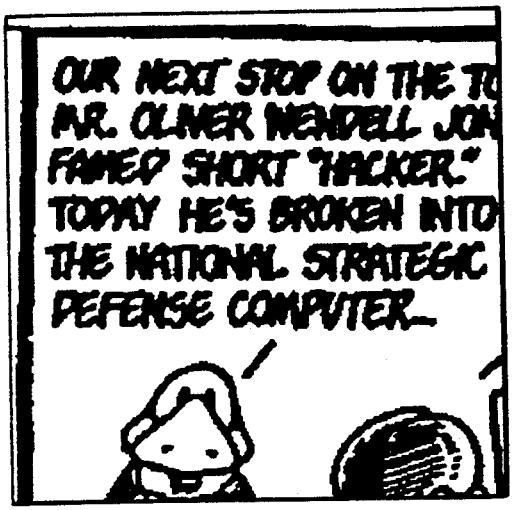
FIGS. 6A through 6D set forth the operation of the present invention method and appartus for detection of parallel edges at different spatial scales.
Figure 6B:
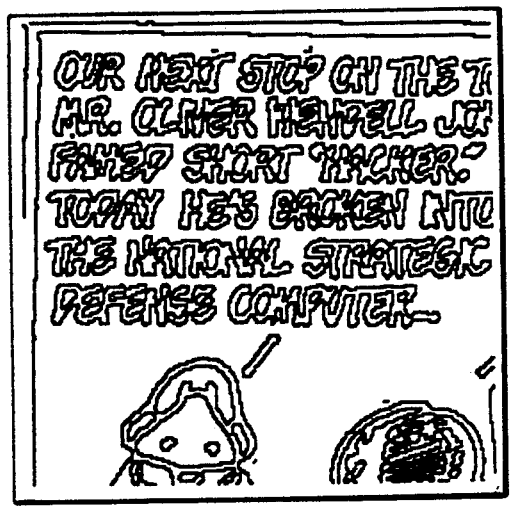
Figure 6C:
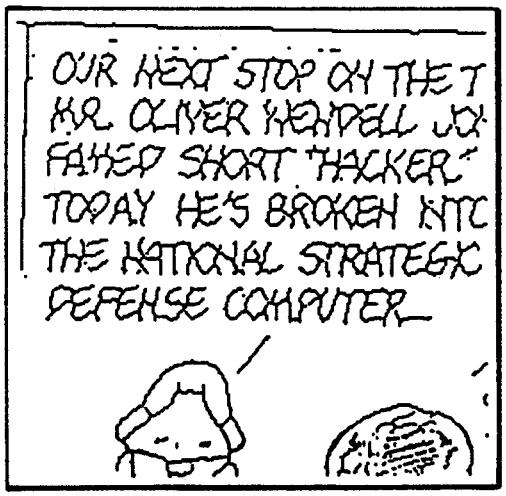
Figure 6D:
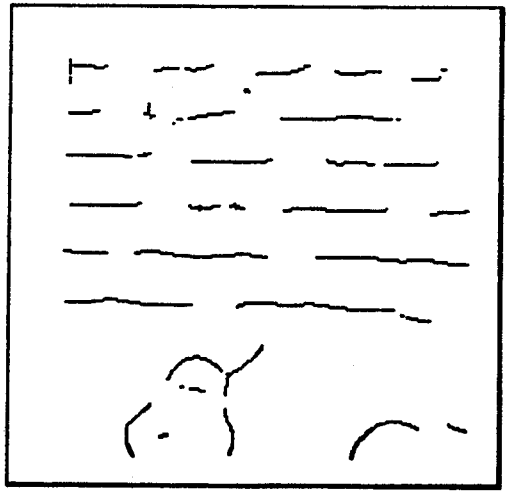

FIGS. 6A through 6D set forth the operation of the present invention system upon a combination of text and simplified drawing information similar to a cartoon feature or the like. The application of the present invention method and apparatus depicted in FIGS. 6A through 6D differs from previous examples in that the resolution of the system has been reduced to sixty percent of the resolution depicted above. Thus, FIG. 6A sets forth the original source image while FIG. 6B sets forth the zero crossing edge detected image resulting from the above-described process. FIG. 6C sets forth the resulting parallelism line image. FIG. 6D depicts the parallelism line image of FIG. 6C recomputed at a substantially more coarse scale. Of interest in FIG. 6D is the resolution of the text words into simple parallelism line images.

Figures 7A, 7B, 7C, 7D:
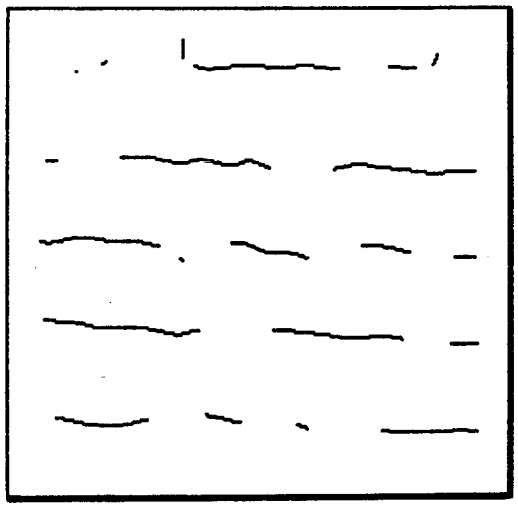
FIGS. 7A through 7D set forth drawings exemplifying the response of the present invention method and apparatus for detection of parallel edges in response to noise inputs.

FIGS. 7A through 7B depict the operation of the present invention system upon a noisy low contrast text image. Accordingly, FIG. 7A depicts the original low contrast noisy image. FIG. 7B depicts the zero crossing edge detection image resulting from the above-described process. It should be noted that some of the noise information is actually stronger in the edge detected image of FIG. 7B. FIG. 7C sets forth the parallelism line image resulting from the above-described present invention process. It should be noted that substantially all of the noise information which was not eliminated by the edge detection process has been eliminated by the present invention parallelism detection method and apparatus. FIG. 7D one again sets forth the parallelism line image resulting when resolution of the system is substantially reduced. Once again, the words of the text image have been resolved to horizontal parallelism lines.

FIGS. 8A and 8B set forth an additional aspect of the present invention in which the gradient field smoothing facilitates the detection of an image element joint or intersection. FIG. 8A sets forth the gradient field image resulting from the processing of a black cross 90 upon a white background 91. In accordance with the above process, the resulting gradient field defines a plurality of vectors which extend generally outwardly from the detected edges of cross 90. FIG. 8B sets forth the resulting smoothed gradient vector field of cross 90. For purposes of illustration, the edges of cross 90 are shown overlaid upon the smoothed gradient vector field. It should be noted that the resulting vectors generally diverge from a center zero vector 92 at the center of cross 90. Thus, the determination that the smoothed gradient vectors tend to radiate outwardly from the center of an image element junction provides an indication of a joint or junction. Also, when the divergence for the smoothed vector field is computed (as set forth below) the largest divergence value will exist at the point of joint intersection. Thus, given a smoothed gradient vector field, the following steps may be preformed to detect intersections or joints of the image elements:

1. Renormalization of the magnitude of the smoothed gradient vector field.
2. Divergence computation for each point in the smoothed gradient vector field.
3. Circular (nondirectional) maxima detection.
4. Joint strength determination.

Divergence is computed in accordance with the following formula:

$$\text{Scalar div}(S) = \frac{\partial S_x}{\partial x} + \frac{\partial S_y}{\partial y}$$

where $S_x$ is the x component of the smoothed gradient vector field and $S_y$ is the y component of the smoothed gradient vector field.

Figures 9A, 9B, 10:
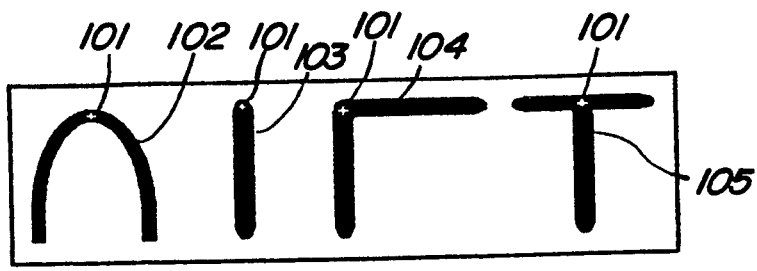

Examination of FIGS. 9A and 9B shows the use of the present invention joint detection on a sample of text materials. The detected joints show as small dots 100. To avoid unduly cluttering in FIG. 9B, several dots are given reference numbers 100. It should be understood, however, that many joint detection dots are therefore unlabeled but represent detected joints nonetheless.

FIG. 10 sets forth a plurality of character stroke combinations which result in joint detection. Each detected joint is indicated by a small white cross 101. Thus, FIG. 10 shows an arch 102, a vertical stroke 103, a corner 104 and a tee 105. It should be noted that joint detection results in joint indications at the peak of arch 102, at the end portion of stroke 103, at the corner of corner 104 and at the intersection of tee 105. Thus, the present invention provides additional helpful information beyond detection of stroke intersection which may be used to analyze image information.

What has been shown is an improved method and apparatus for detecting parallel edges in image processing. The method shown utilizes a smoothed gradient field in which minima are detected and in which a parallelism strength quantity is computed in accordance with predetermined characteristics to produce a parallelism line image superior to the image processing capabilities of standard edge detection systems.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in detecting parallel and near parallel edges in an image, parallel edge detection means comprising:
   edge detection means for detecting the edges within the image corresponding to image contrast changes and for producing an edge detected image;
   edge gradient means for constructing a gradient vector field for the edge detected image;
   gradient field smoothing means for smoothing the gradient vector field to a smoothed gradient vector field;
   minima detection means for detecting the magnitude minima within the smoothed gradient vector field; and
   parallelism strength means for determining parallelism strength of the smoothed vector field and for producing a parallelism line image.

2. Parallel edge detection means as set forth in claim 1 wherein said edge detection means include:
   LOG means convolving the image using a Laplacian of Gaussian edge detection operator; and
   sign detection means operative upon the convolved image to detect sign changes and establish an image edge coinciding with detected sign changes.

3. Parallel edge detection means as set forth in claim 2 wherein said edge gradient means determine the gradient at each pixel along the detected edge of the established image edges as $$\text{gradient LOG} = <\partial \text{LOG}/\partial X, \partial \text{LOG}/\partial Y>$$

where LOG represents the Laplacian of Gaussian image and X and Y represent X and Y directions on the image.

4. Parallel edge detection means as set forth in claim 3 wherein said gradient field smoothing means convolve the vector gradient field in accordance with a two dimensional Gaussian function.

5. Parallel edge detection means as set forth in claim 4 wherein the two dimensional Gaussian function is $$G(r) = \frac{1}{2\pi\sigma^2} e^{\frac{-r2}{2\sigma^2}}$$

wherein r represents radius, and $\sigma$ represents the standard deviation of the Gaussian function and e represents 2.718.

6. Parallel edge detection means as set forth in claim 5 wherein said minima detection means include:
means for determining the second derivative of the smoothed gradient field in X and Y directions;
means for establishing a direction for local minima corresponding to the most positive second derivative; and
means for examining the smoothed gradient field for local minima in the selected direction.

7. Parallel edge detection means as set forth in claim 6 wherein said parallelism strength means employ a first criteria to determine parallelism strength responsive to the magnitude of the smoothed gradient field and a second criteria determined as $$\text{strength measure}(i,j) = \left[\left(\frac{\partial^2 V}{\partial x^2}\right)^2 + \left(\frac{\partial^2 V}{\partial y^2}\right)^2\right]^{\frac{1}{2}}$$

wherein i and j are the point coordinates and V is the magnitude of the smoothed gradient vector field.

8. Parallel edge detection means as set forth in claim 1 further including:
divergence means operative upon said smoothed gradient field for producing joint detection indicia at points of an image corresponding to curve maxima, stroke ends, corners and intersections.

9. Parallel edge detection means as set forth in claim 8 wherein the joint indicia are used to resolve and interpret image elements.

10. For use in detecting parallel and near parallel edges in an image, parallel edge detection means comprising:
edge detection means for detecting the edges within the image corresponding to image contrast changes and for producing an edge detected image;
edge gradient means for producing a gradient vector field for the edge detected image;
gradient field smoothing means for smoothing the gradient vector field to a smoothed gradient vector field;
minima detection means for detecting the magnitude minima within the smoothed gradient vector field; and
divergence means operative upon said smoothed gradient field for producing joint detection indicia.

11. Parallel edge detection means as set forth in claim 10 wherein said joint detection indicia are produced at image points corresponding to curve maxima, stroke ends, corners and intersections.

12. Parallel edge detection means as set forth in claim 11 wherein the joint indicia are used to resolve and interpret image elements.

* * * * *